United States Patent
Ryu

(10) Patent No.: US 8,681,435 B2
(45) Date of Patent: Mar. 25, 2014

(54) MACRO LENS SYSTEM AND PICKUP DEVICE INCLUDING THE SAME

(75) Inventor: Jae-myung Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 12/903,299

(22) Filed: Oct. 13, 2010

(65) Prior Publication Data

US 2011/0096410 A1    Apr. 28, 2011

(30) Foreign Application Priority Data

Oct. 28, 2009 (KR) ......................... 10-2009-0102973

(51) Int. Cl.
*G02B 15/24* (2006.01)
*G02B 15/28* (2006.01)

(52) U.S. Cl.
CPC ............... *G02B 15/28* (2013.01); *G02B 15/24* (2013.01)
USPC ............................ 359/693; 359/684; 359/764

(58) Field of Classification Search
CPC ......... G02B 15/28; G02B 15/22; G02B 25/24
USPC .................... 359/693, 758, 764, 763
See application file for complete search history.

(56) References Cited

U.S. PATENT DOCUMENTS

| | | | | |
|---|---|---|---|---|
| 4,861,145 A | * | 8/1989 | Kikuchi | 359/687 |
| 5,202,992 A | * | 4/1993 | Banno et al. | 359/676 |
| 2008/0278824 A1 | * | 11/2008 | Shirota | 359/684 |
| 2010/0128361 A1 | * | 5/2010 | Shirota | 359/684 |

FOREIGN PATENT DOCUMENTS

| | | | |
|---|---|---|---|
| CN | 101295070 A | 10/2008 | |
| JP | 07-152001 A | 6/1995 | |
| JP | 11-237544 A | 8/1999 | |
| JP | 2000214380 A * | 8/2000 | ............ G02B 13/00 |
| JP | 2000-292690 A | 10/2000 | |
| JP | 2001-272601 A | 10/2001 | |
| JP | 2003-329919 A | 11/2003 | |
| JP | 2004-061680 A | 2/2004 | |
| JP | 2005-004041 A | 1/2005 | |
| JP | 2005-284101 A | 10/2005 | |
| JP | 2005-292345 A | 10/2005 | |
| JP | 2006-023680 A | 1/2006 | |
| JP | 2006-106112 A | 4/2006 | |

(Continued)

OTHER PUBLICATIONS

Hecht, Eugene. Optics. Reading, MA: Addison-Wesley, 1998. pp. 160-69. Print.*

(Continued)

*Primary Examiner* — Zachary Wilkes
(74) *Attorney, Agent, or Firm* — Drinker Biddle & Reath LLP

(57) ABSTRACT

A macro lens system and a pickup device that includes the macro lens system include, in order from an object side to an image side, a first lens group having a positive refractive power, a second lens group having a negative refractive power, a third lens group having a positive refractive power, a fourth lens group having a positive refractive power, and a fifth lens group having a negative refractive power, wherein, during focusing, the first lens group, the third lens group, and the fifth lens group are fixed, and the second lens group and the fourth lens group are moved.

14 Claims, 13 Drawing Sheets

(56) References Cited

FOREIGN PATENT DOCUMENTS

| JP | 2006-153942 A | 6/2006 |
| JP | 2006-171432 A | 6/2006 |
| JP | 2008-257200 A | 10/2008 |

OTHER PUBLICATIONS

Machine Translation of JP 2000-143380 published Aug. 2000.*

Office Action issued for CN 201010528465.6 (Dec. 27, 2013).

* cited by examiner

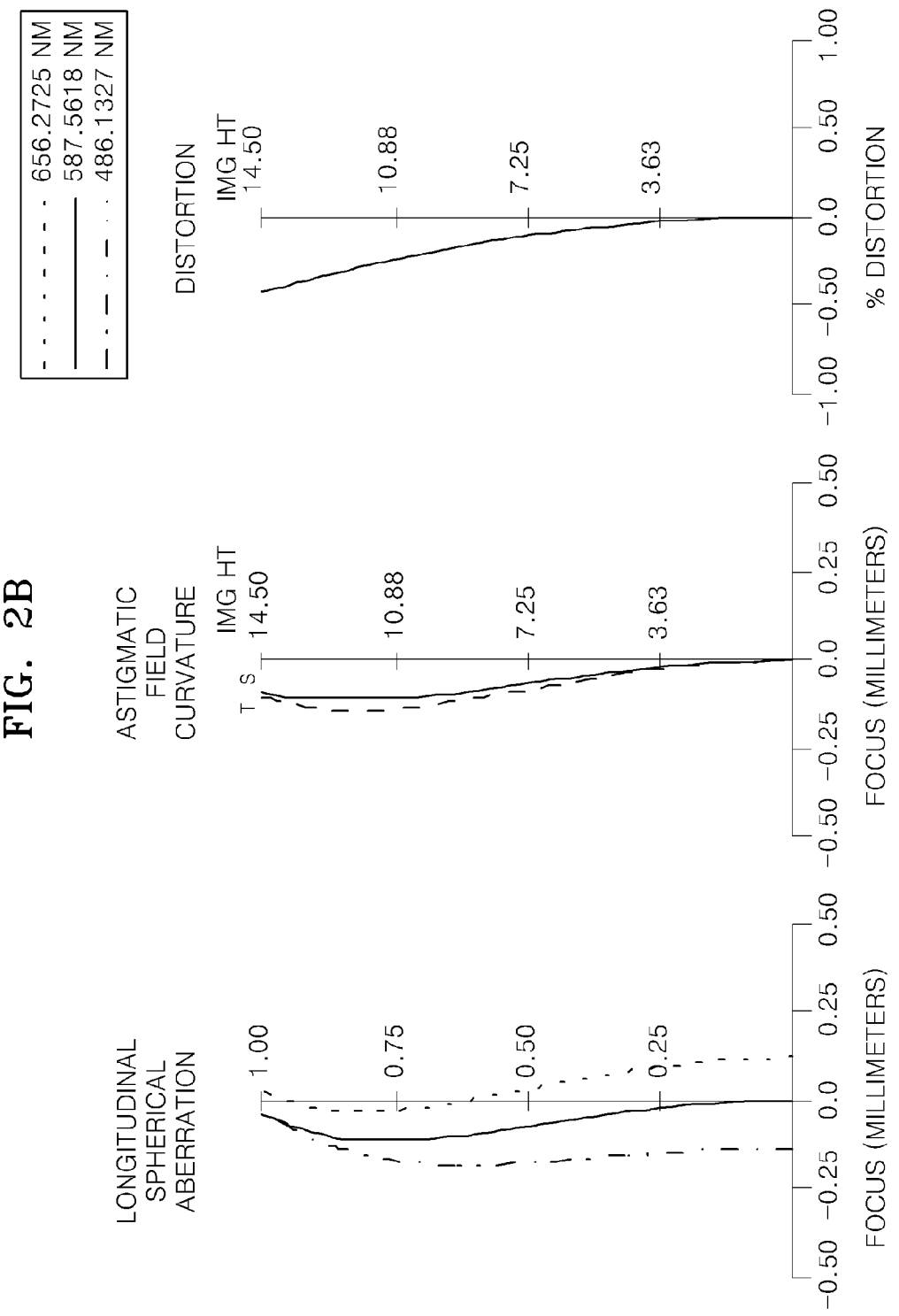

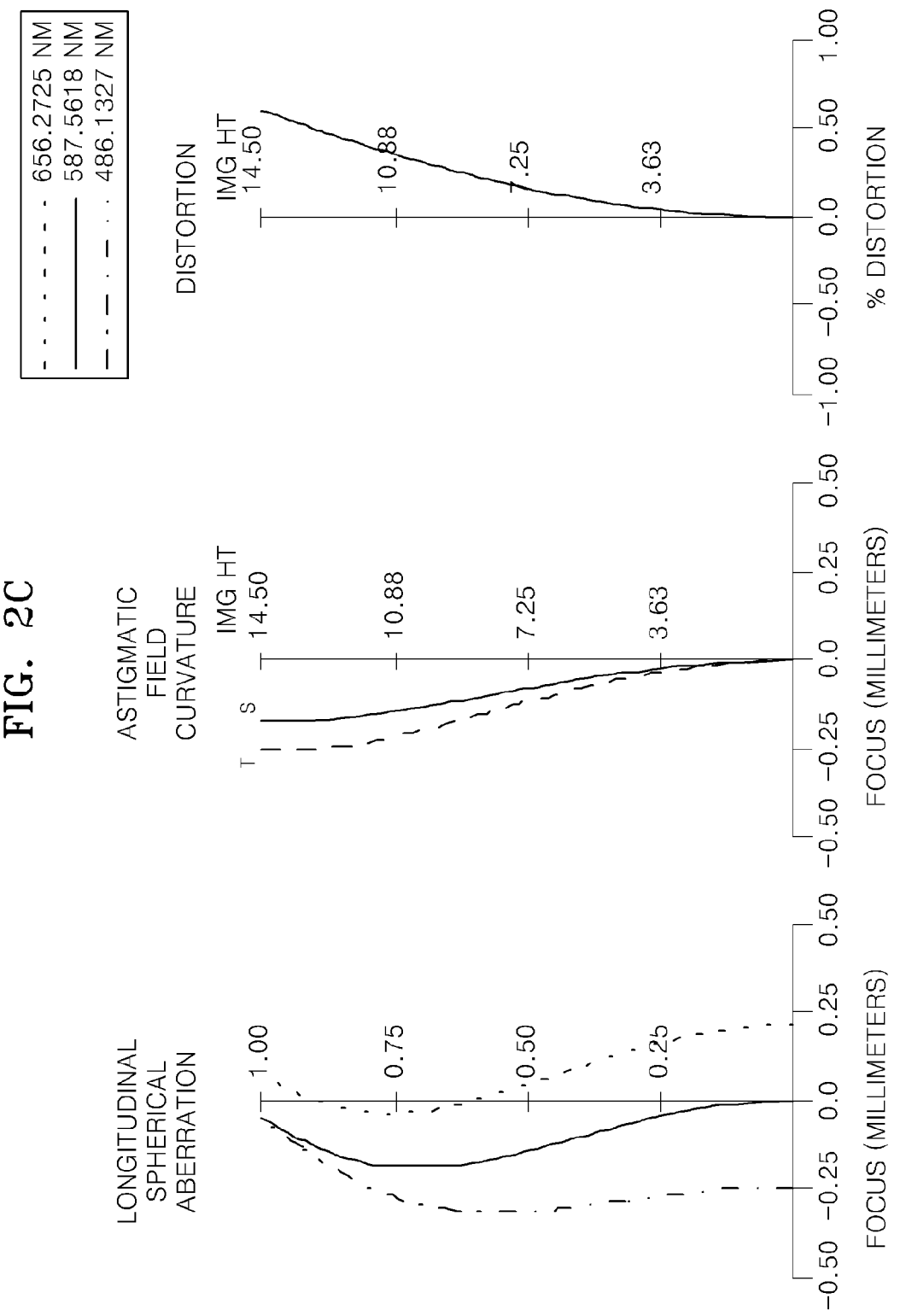

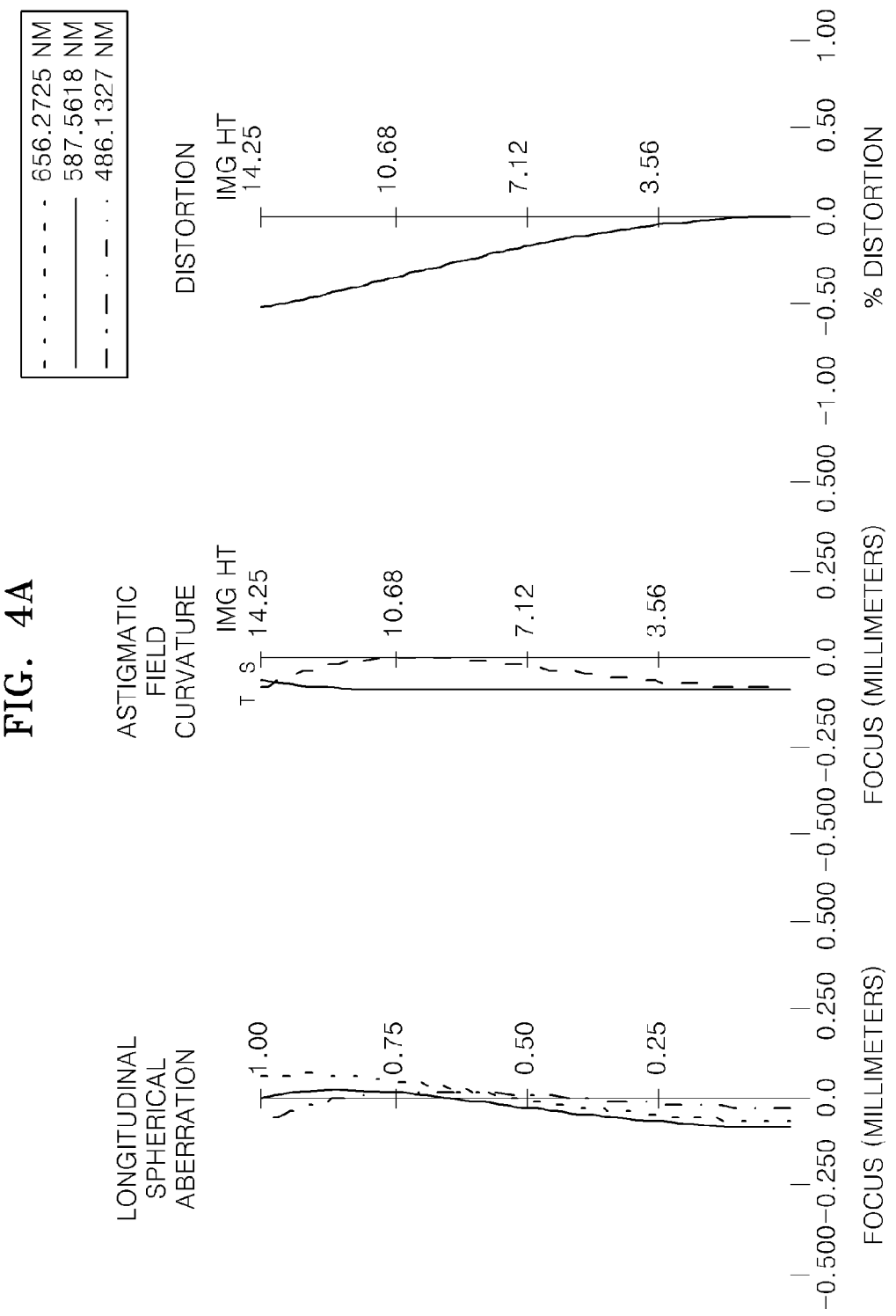

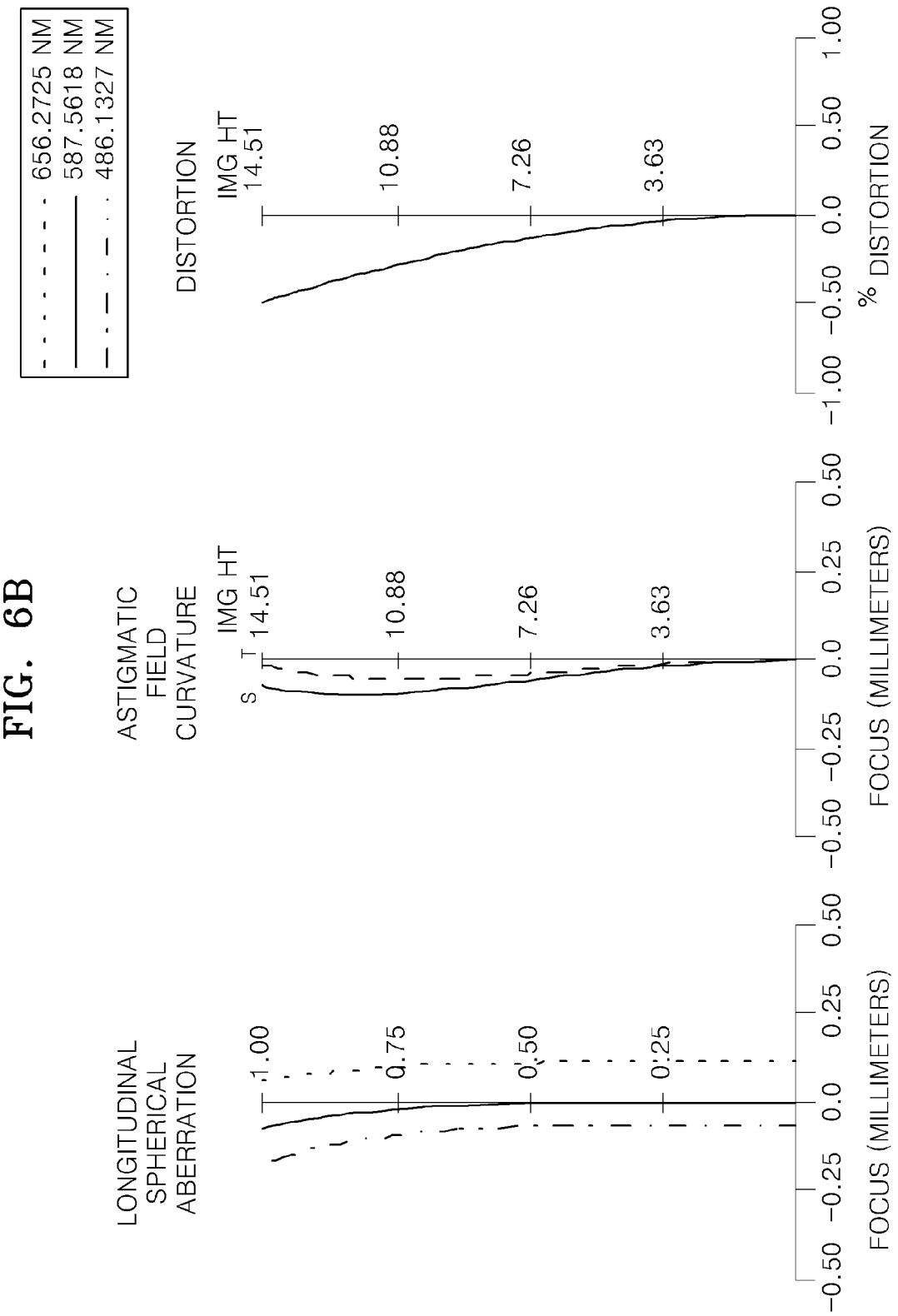

MACRO LENS SYSTEM AND PICKUP DEVICE INCLUDING THE SAME

CROSS-REFERENCE TO RELATED PATENT APPLICATION

This application claims the priority benefit of Korean Patent Application No. 10-2009-0102973, filed on Oct. 28, 2009, in the Korean Intellectual Property Office, the disclosure of which is incorporated herein in its entirety by reference.

BACKGROUND

1. Field of the Invention

Embodiments relate to a lens system with a large aperture and capable of close-up photographing and a pickup device including the same.

2. Description of the Related Art

Recently, demand for single lens reflex cameras has increased significantly, and digital single lens reflex cameras including image sensors, such as charge coupled devices (CCDs) or complementary metal-oxide semiconductors (CMOSs) have been receiving more attention than film cameras. In line with users' needs and technical development of image sensors, digital single lens reflex cameras are having higher and higher quality, and lenses with various functions have been developed. For example, demand for lens systems that may perform general photographing of objects as well as macro-photographing is on the rise.

SUMMARY

Embodiments include a macro lens system of which an optical full length does not change during focusing and that is portable.

Embodiments also include a pickup device including the macro lens system.

According to an embodiment, a macro lens system comprises, in order from an object side to an image side, a first lens group having a positive refractive power, a second lens group having a negative refractive power, a third lens group having a positive refractive power, a fourth lens group having a positive refractive power, and a fifth lens group including a single lens group having a negative refractive power, wherein, during focusing, the first lens group, the third lens group, and the fifth lens group are fixed, and the second lens group and the fourth lens group are moved.

The fifth lens group may include only one lens.

The macro lens system may satisfy an expression below:

$$-1.0 \le \frac{c_f + c_r}{c_f - c_r} \le 1.0$$

where $c_f$ denotes a curvature of a lens surface of the third lens group nearest to the object side, and $c_r$ denotes a curvature of a lens surface of the third lens group nearest to the image side.

The first lens group may include at least one doublet lens.

According to another embodiment, a macro lens system includes, in order from an object side to an image side, a first lens group having a positive refractive power, a second lens group having a negative refractive power that moves toward the image side from the object side during focusing, a third lens group having a positive refractive power, a fourth lens group having a positive refractive power that moves toward the object side from the image side during focusing, and a fifth lens group having a negative refractive power. The macro lens system satisfies an expression below:

$$-0.9 \le \frac{f_1 \cdot f_2}{f_\infty \cdot (f_1 + f_2)} \le -0.55$$

where $f_1$ denotes a focal length of the first lens group, $f_2$ denotes a focal length of the second lens group, and $f_\infty$ denotes an overall focal length at an infinite object distance.

The first lens group, the third lens group, and the fifth lens group may be fixed during focusing.

The third lens group may include only one lens.

The third lens group may include a stop.

The second lens group may include no biconvex lens.

A lens surface of the third lens group nearest to the image side may be a convex lens surface or a planar lens surface.

The macro lens system may have a magnification in the range of 0 to −1.

According to another embodiment, a pickup device includes a macro lens system and an imaging device that receives light converged by the macro lens system. The macro lens system includes, in order from an object side to an image side, a first lens group having a positive refractive power, a second lens group having a negative refractive power, a third lens group having a positive refractive power, a fourth lens group having a positive refractive power, and a fifth lens group having a negative refractive power, wherein, during focusing, the first lens group, the third lens group, and the fifth lens group are fixed, and the second lens group and the fourth lens group are moved. The fifth lens group includes a single lens group.

According to another embodiment, a pickup device includes a macro lens system and an imaging device that receives light converged by the macro lens system. The macro lens system includes, in order from an object side to an image side, a first lens group having a positive refractive power, a second lens group having a negative refractive power that moves toward the image side from the object side during focusing, a third lens group having a positive refractive power, a fourth lens group having a positive refractive power that moves toward the object side from the image side during focusing, and a fifth lens group having a negative refractive power. The macro lens system satisfies an expression below:

$$-0.9 \le \frac{f_1 \cdot f_2}{f_\infty \cdot (f_1 + f_2)} \le -0.55$$

where $f_1$ denotes a focal length of the first lens group, $f_2$ denotes a focal length of the second lens group, and $f_\infty$ denotes an overall focal length when focused on an object at infinity.

BRIEF DESCRIPTION OF THE DRAWINGS

The above and other features and advantages will become more apparent by describing in detail exemplary embodiments with reference to the attached drawings in which:

FIG. 2B is a graph showing longitudinal spherical aberration, astigmatic field curvature, and distortion of the macro lens system of FIG. 1, when M=−0.5;

FIG. 2C is a graph showing longitudinal spherical aberration, astigmatic field curvature, and distortion of the macro lens system of FIG. 1, when M=−1.0;

FIG. 4A is a graph showing longitudinal spherical aberration, astigmatic field curvature, and distortion of the macro lens system of FIG. 3, when M=0.0;

FIG. 6B is a graph showing longitudinal spherical aberration, astigmatic field curvature, and distortion of the macro lens system of FIG. 5, when M=−0.5;

DETAILED DESCRIPTION

Hereinafter, a lens system according to an embodiment and a pickup device including the same will be described in more detail.

According to an embodiment, a macro lens system which is an optical system of which an overall length does not change during a magnification change for convenience of portability can be used in cameras and video cameras. The macro lens system includes, in order from an object side, a first lens group having a positive refractive power, a second lens group having a negative refractive power, a third lens group having a positive refractive power, a fourth lens group having a positive refractive power, and a fifth lens group having a negative refractive power. In the macro lens system, during focusing, the first lens group, the third lens group, and the fifth lens group are fixed, and the second lens group and the fourth lens group are moved so as not to change the overall length of the lens system. The fifth lens group may not include several sub-groups and may include only a single lens group so as to maintain the overall length of the lens system. In this regard, the single lens group means that there are no sub-groups within the single lens group that move independently from each other. The fifth lens group may include one lens. For example, the lens may be a biconcave lens.

Figure 1:
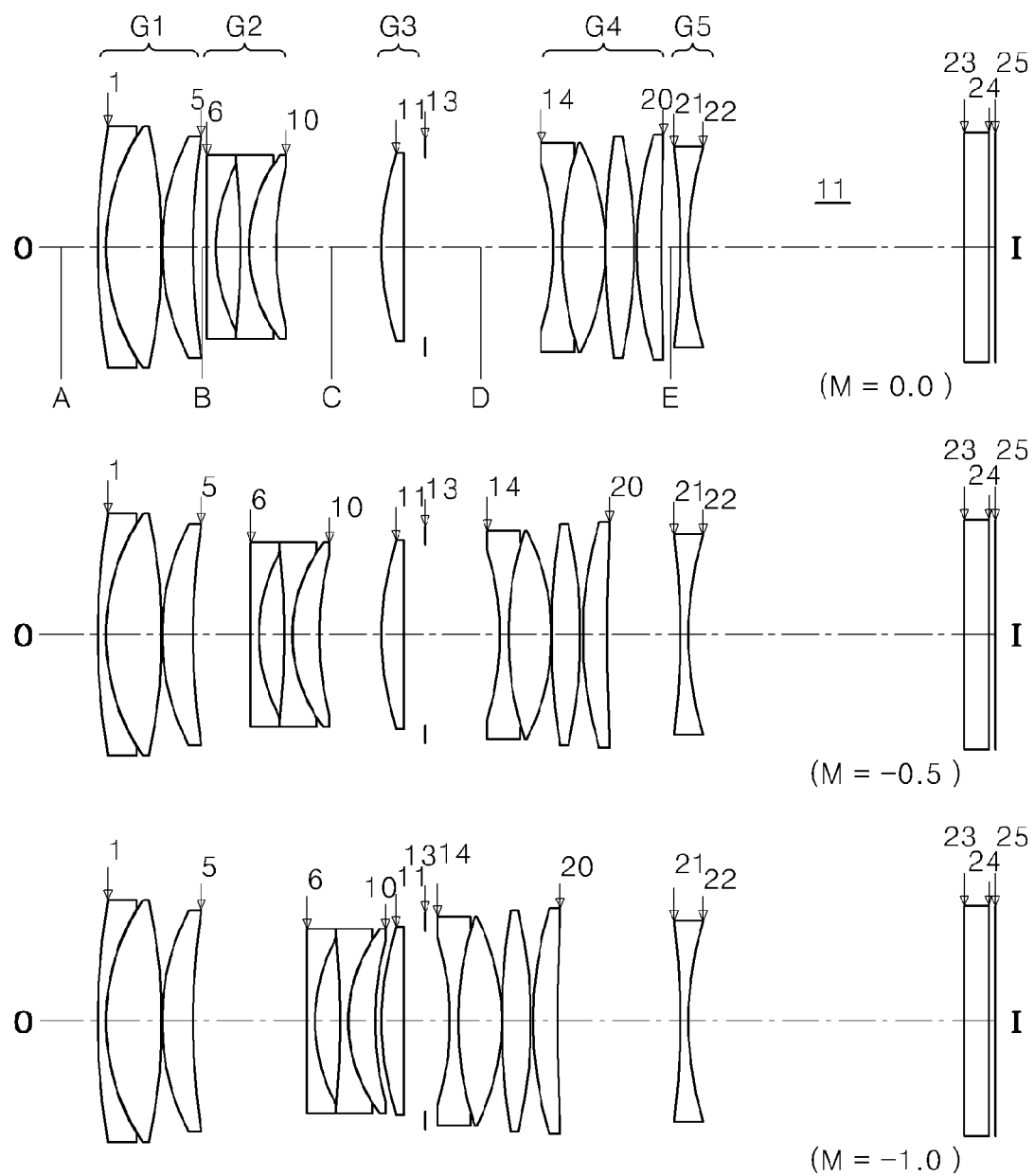
FIG. 1 is a view illustrating a macro lens system according to an embodiment, wherein magnification M satisfies each of the following Equations: M=0, M=−0.5, and M=−1.0.

Referring to FIG. 1, the macro lens system includes a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. The first lens group G1 may include at least one lens selected from the group consisting of a negative lens and a positive lens. In addition, the first lens group G1 may include a doublet lens consisting of a negative lens and a positive lens. The second lens group G2 may include at least one lens selected from the group consisting of a negative lens and a positive lens. In addition, the second lens group G2 may include a doublet lens consisting of a negative lens and a positive lens. The third lens group G3 may include a lens and a stop on an object side O or an image side I of the third lens group G3. The fourth lens group G4 may include at least one lens selected from the group consisting of a negative lens and a positive lens. In addition, the fourth lens group G4 may include at least one doublet lens. The fifth lens group G5 may include at least one lens. In FIG. 1, the fifth lens group G5 includes a single lens, but may instead include a plurality of lenses.

The second lens group G2 has a strong negative refractive power, and may participate in magnification change. The third lens group G3 includes a stop ST, and may correct spherical aberration. The stop ST may be arranged on the object side O or the image side I of the third lens group G3. The fourth lens group G4 may correct a change of image plane position, and the fifth lens group G5 may correct astigmatic field curvature and distortion. Main functions of each lens group have been described, but are not limited thereto.

When there are no lens groups around the stop ST, it may be difficult to correct spherical aberration at an infinite object distance. In addition, since the second lens group G2 has a negative refractive power, most light that is transmitted through the second lens group G2 is diverged, and thus the size of the fourth lens group G4, positioned next to the stop ST, is to become larger. As a result, the weight of the fourth lens group G4 may increase. However, the fourth lens group G4 may move during focusing, and thus the lighter weight of the fourth lens group G4 may be better. Thus, in the present embodiment, the third lens group G3 having a positive refractive power is positioned next to the second lens group G2, whereby the aperture of the fourth lens group G4 may be decreased so that the weight of the fourth lens group G4 may be decreased. In addition, due to the strong negative refractive power of the second lens group G2 when focusing on an object at infinity, axial marginal rays are collimated or are diverged. Then, the rays are converged again due to the positive refractive power of the third lens group G3. To effectively correct spherical aberration with respect to such rays, a lens surface of the third lens group G3 nearest to the object side O may be a convex surface.

Meanwhile, a lens surface of the third lens group G3 nearest to the image side I may be a convex surface. The lens surface may resemble a plane by being only slightly convex. For example, since a combined focal length of the first lens group G1 and the second lens group G2 at an infinite object distance is large, the lens surface of the third lens group G3 nearest to the image side I has a large curvature when axial marginal rays through the third lens group G3 are parallel to a light axis. Thus, the nearly plane convex surface of the third lens group G3 is suitable for use in correcting spherical aberration.

In an embodiment, when rays transmitted through the third lens group G3 are converged by the positive refractive power of the third lens group G3, the lens surface of the third lens group G3 nearest to the image side I may include a convex surface. In this case, additional correction of spherical aberration may be possible in the third lens group G3. The correction of spherical aberration by the lens shape may be explained by a principle of spherical aberration correction in a single lens. In addition, when correcting spherical aberration, coma aberration may also be corrected.

The shape of lens of the third lens group G3 for spherical aberration correction may satisfy the following condition represented by Expression 1:

$$-1.0 \le \frac{c_f + c_r}{c_f - c_r} \le 1.0 \qquad (1)$$

where $c_f$ denotes a curvature of the lens surface of the third lens group G3 nearest to the object side O, and $c_r$ denotes a curvature of the lens surface of the third lens group G3 nearest to the image side I.

For a single lens, the condition of the shape of lens for aberration correction is referred to as shape factor (refer to P. Mouroulis and J. Macdonald, Geometrical Optics and Optics Design (Oxford Univ. Press, 1997), Chap. 9). For example, when the shape factor of a lens is −1 or +1, the lens represents a planar convex lens. When the shape factor is +1, it represents a planar convex lens of which a surface nearest to the object side O is convex. When the shape factor of a lens is −1, the lens represents a planar convex lens of which a surface nearest to the image side I is convex.

The third lens group G3 may include a lens, and the lens of the third lens group G3 may be a planar convex lens or a biconvex lens.

A range of focal lengths of the third lens group G3 for spherical aberration correction may satisfy the following condition represented by Expression 2 below:

$$-0.9 \le \frac{f_1 \cdot f_2}{f_\infty \cdot (f_1 + f_2)} \le -0.55 \qquad (2)$$

where $f_1$ denotes a focal length of the first lens group G1, $f_2$ denotes a focal length of the second lens group G2, and $f_\infty$ denotes a total focal length at an infinite object distance.

The focal length range of the third lens group G3 for spherical aberration correction depends on the combined focal length of the first lens group G1 and the second lens group G2. This is because spherical aberration depends on a magnification factor determined by the first lens group G1 and the second lens group G2. The combined focal length of the first lens group G1 and the second lens group G2 is represented by Expression 3 below:

$$\frac{1}{f_{12}} = \frac{1}{f_1} + \frac{1}{f_2} - \frac{d}{f_1 \cdot f_2} \qquad (3)$$

where $f_{12}$ denotes the combined focal length of the first lens group G1 and the second lens group G2, $f_1$ denotes the focal length of the first lens group G1, $f_2$ denotes the focal length of the second lens group G2, and d denotes a distance between the first lens group G1 and the second lens group G2. In this regard, the product of $f_1$ and $f_2$ generally has a very high value at an infinite object distance compared with the distance d between the first lens group G1 and the second lens group G2, and thus the third term on the right side of Expression 3 may be disregarded. Thus, the synthetic focal length of the first lens group G1 and the second lens group G2 may be determined according to the focal lengths of the first lens group G1 and the second lens group G2.

The second lens group G2 may not include a biconvex lens. To decrease an f-number, the aperture of the second lens group G2 may be large. However, when the aperture of the second lens group G2 increases, the weight thereof increases. The increase in the weight of the second lens group G2, which is a moving lens group, increases a load on a driving motor. When the second lens group G2 includes the biconvex lens, the degree of weight increase according to the aperture increase is greater than in a case where the second lens group includes a meniscus lens. Thus, it is desirable not to use the biconvex lens in the second lens group G2. For example, the second lens group G2 may include a meniscus lens, a concave lens, or a planar concave lens.

The macro lens system may have a small F-number, thus providing high brightness and being capable of photographing at 1× magnification. In the present embodiments, by using small number of lenses by distributing refractive power in each lens group, a lens system with a small F-number, having a large aperture, and being lightweight may be obtained. The macro lens system may have a convergence magnification in the range of 0 to −1×. In addition, the overall length of the lens system does not change during magnification change, and the fifth lens group G5 includes only a single independent lens group, thereby enabling miniaturization of the lens system.

Macro lens systems according to the following embodiments, prepared according to various design methods, will now be described. Hereinafter, f denotes the overall focal length of the lens system, and the lens system may include a filter disposed nearest to the image side I in the drawings illustrating each embodiment.

First Embodiment

FIG. 1 is a view illustrating a macro lens system according to an embodiment, wherein magnification M satisfies each of the following Equations: M=0, M=−0.5, and M=−1.0, respectively.

| \multicolumn{5}{c}{f = 58.7 mm, F-number = 2.46, 2ω = 27.8°} |
| Lens surface | Radius of curvature | Thickness or distance | Refractive index ($n_d$) | Abbe number ($v_d$) |
| --- | --- | --- | --- | --- |
| OBJECT | ∞ | A | | |
| S1 | 86.54 | 1.1 | 1.84666 | 23.8 |
| S2 | 27.448 | 7 | 1.61800 | 63.4 |
| S3 | −80.567 | 0.1 | | |
| S4 | 30.472 | 3.88 | 1.88300 | 40.8 |
| S5 | 84.25 | B | | |
| S6 | ∞ | 1 | 1.67270 | 32.2 |
| S7 | 23.281 | 3.191 | | |
| S8 | −98.577 | 1 | 1.71300 | 53.9 |
| S9 | 18.42 | 3.5 | 1.84666 | 23.8 |
| S10 | 45.542 | C | | |
| S11 | 40.097 | 3.03 | 1.84666 | 23.8 |
| S12 | −506.86 | 2.5 | | |
| S13 (STOP) | ∞ | D | | |
| S14 | −35.5 | 1 | 1.84666 | 23.8 |
| S15 | 42.123 | 5.49 | 1.49700 | 81.6 |
| S16 | −30.96 | 0.1 | | |
| S17 | 109.136 | 3.73 | 1.88300 | 40.8 |
| S18 | −57.241 | 0.1 | | |
| S19 | 47.933 | 3.33 | 1.88300 | 40.8 |
| S20 | 352.589 | E | | |
| S21 | −102.127 | 1.1 | 1.62004 | 36.3 |
| S22 | 40.255 | F | | |
| S23 | ∞ | 3.7 | 1.51680 | 64.2 |
| S24 | ∞ | G | | |
| S25 (IMAGE) | ∞ | | | |

The following chart shows variable distances in the macro lens system of FIG. 1 during focusing.

| Variable distance | M = 0.0 | M = −0.5 | M = −1.0 |
|---|---|---|---|
| A | ∞ | 117.0984 | 75.8 |
| B | 1.8922 | 7.3870 | 14.5347 |
| C | 13.4085 | 7.9137 | 0.7659 |
| D | 16.3183 | 9.3162 | 3.0000 |
| E | 2.2302 | 9.2323 | 15.5485 |
| F | 34.9999 | 34.9999 | 34.9999 |

Figure 2A:
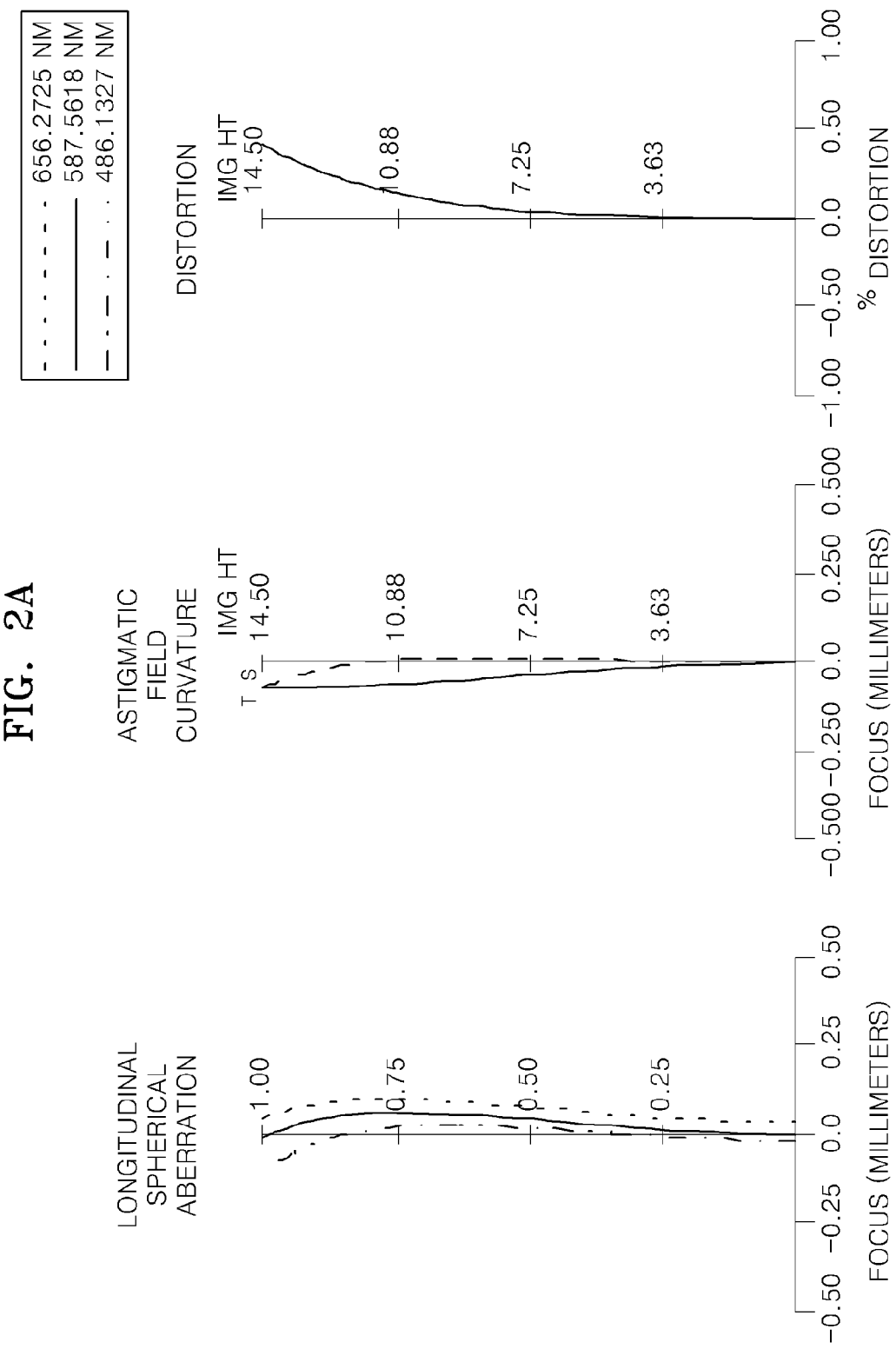
FIG. 2A is a graph showing longitudinal spherical aberration, astigmatic field curvature, and distortion of the macro lens system of FIG. 1, when M=0.0.

FIG. 2A is a graph showing longitudinal spherical aberration, astigmatic field curvature, and distortion of the macro lens system of FIG. 1, when M=0.0. FIG. 2B is a graph showing longitudinal spherical aberration, astigmatic field curvature, and distortion of the macro lens system of FIG. 1, when M=−0.5. FIG. 2C is a graph showing longitudinal spherical aberration, astigmatic field curvature, and distortion of the macro lens system of FIG. 1, when M=−1.0. Spherical aberration occurs in relation to C-line, d-line, and F-line. C-line has a wavelength of 656.3 nm, d-line has a wavelength of 587.6 nm, and F-line has a wavelength of 486.1 nm. In the astigmatic field curvature, a solid line is aberration with respect to a sagittal image plane, and a dotted line is aberration with respect to a tangential image plane.

Second Embodiment

Figure 3:
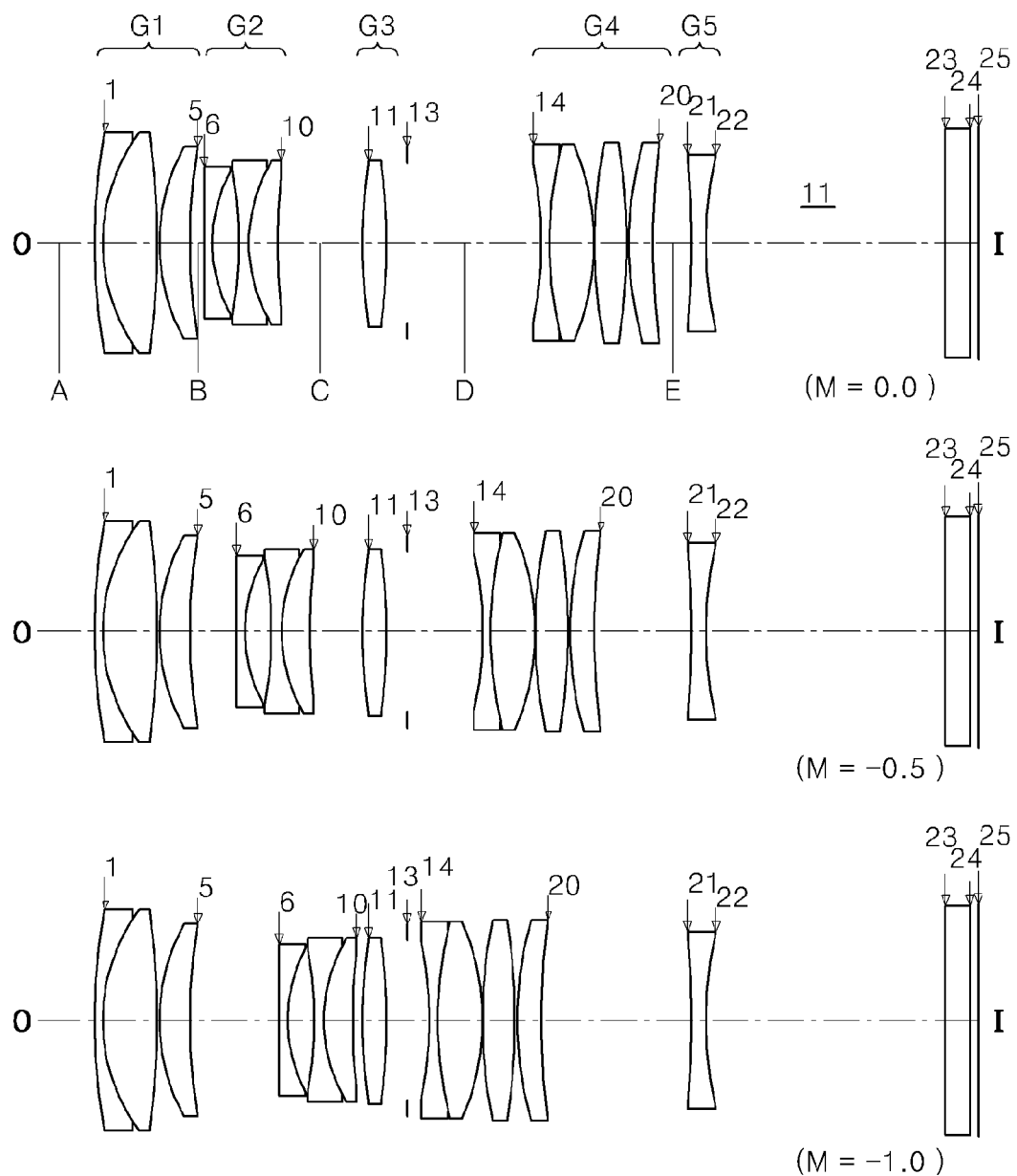
FIG. 3 is a view illustrating a macro lens system according to another embodiment, wherein magnification M satisfies each of the following Equations: M=0, M=−0.5, and M=−1.0.

FIG. 3 is a view illustrating a macro lens system according to another embodiment, wherein magnification M satisfies each of the following Equations: M=0, M=−0.5, and M=−1.0.

f = 58.15 mm, F-number = 2.88, 2ω = 27.6°

| Lens surface | Radius of curvature | Thickness or distance | Refractive index ($n_d$) | Abbe number ($v_d$) |
|---|---|---|---|---|
| OBJECT | ∞ | A | | |
| S1 | 63.280 | 1.1 | 1.84666 | 23.8 |
| S2 | 22.329 | 6.78 | 1.62041 | 60.3 |
| S3 | −81.506 | 0.1 | | |
| S4 | 24.214 | 3.88 | 1.77250 | 49.6 |
| S5 | 75.611 | B | | |
| S6 | ∞ | 1 | 1.80610 | 33.3 |
| S7 | 18.796 | 3.326 | | |
| S8 | −46.289 | 1 | 1.62041 | 60.3 |
| S9 | 19.287 | 3.5 | 1.84666 | 23.8 |
| S10 | 62.670 | C | | |
| S11 | 67.109 | 3.03 | 1.84666 | 23.8 |
| S12 | −67.109 | 2.5 | | |
| S13 (STOP) | ∞ | D | | |
| S14 | −46.919 | 1 | 1.84666 | 23.8 |
| S15 | 48.961 | 5.41 | 1.80420 | 46.5 |
| S16 | −30.432 | 0.1 | | |
| S17 | 70.554 | 4 | 1.83481 | 42.7 |
| S18 | −70.554 | 0.1 | | |
| S19 | 45.248 | 3 | 1.83400 | 37.3 |
| S20 | 81.462 | E | | |
| S21 | −104.623 | 1.8 | 1.80518 | 25.5 |
| S22 | 52.781 | F | | |
| S23 | ∞ | 3.0 | 1.51680 | 64.2 |
| S24 | ∞ | G | | |
| S25 (IMAGE) | ∞ | | | |

The following chart shows variable distances in the macro lens system of FIG. 3 during focusing.

| Variable distance | M = 0.0 | M = −0.5 | M = −1.0 |
|---|---|---|---|
| A | ∞ | 119.3370 | 75.8 |
| B | 1.7522 | 5.7979 | 10.9850 |
| C | 10.4342 | 6.3884 | 1.2014 |
| D | 16.5399 | 9.2964 | 3.0007 |
| E | 4.7566 | 12.0001 | 18.2958 |
| F | 29.3912 | 29.3912 | 29.3912 |

Figure 4B:
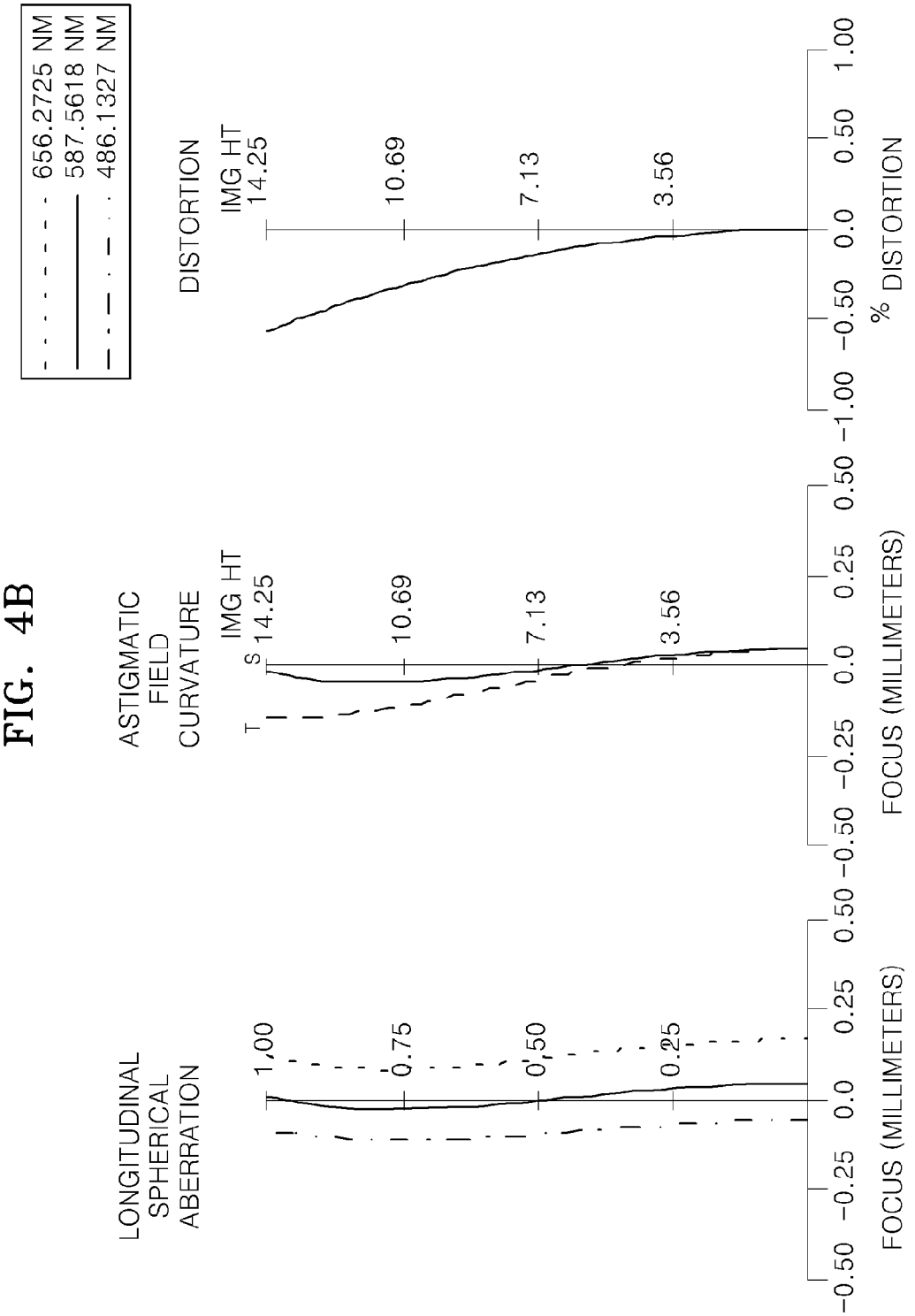
FIG. 4B is a graph showing longitudinal spherical aberration, astigmatic field curvature, and distortion of the macro lens system of FIG. 3, when M=−0.5.
Figure 4C:
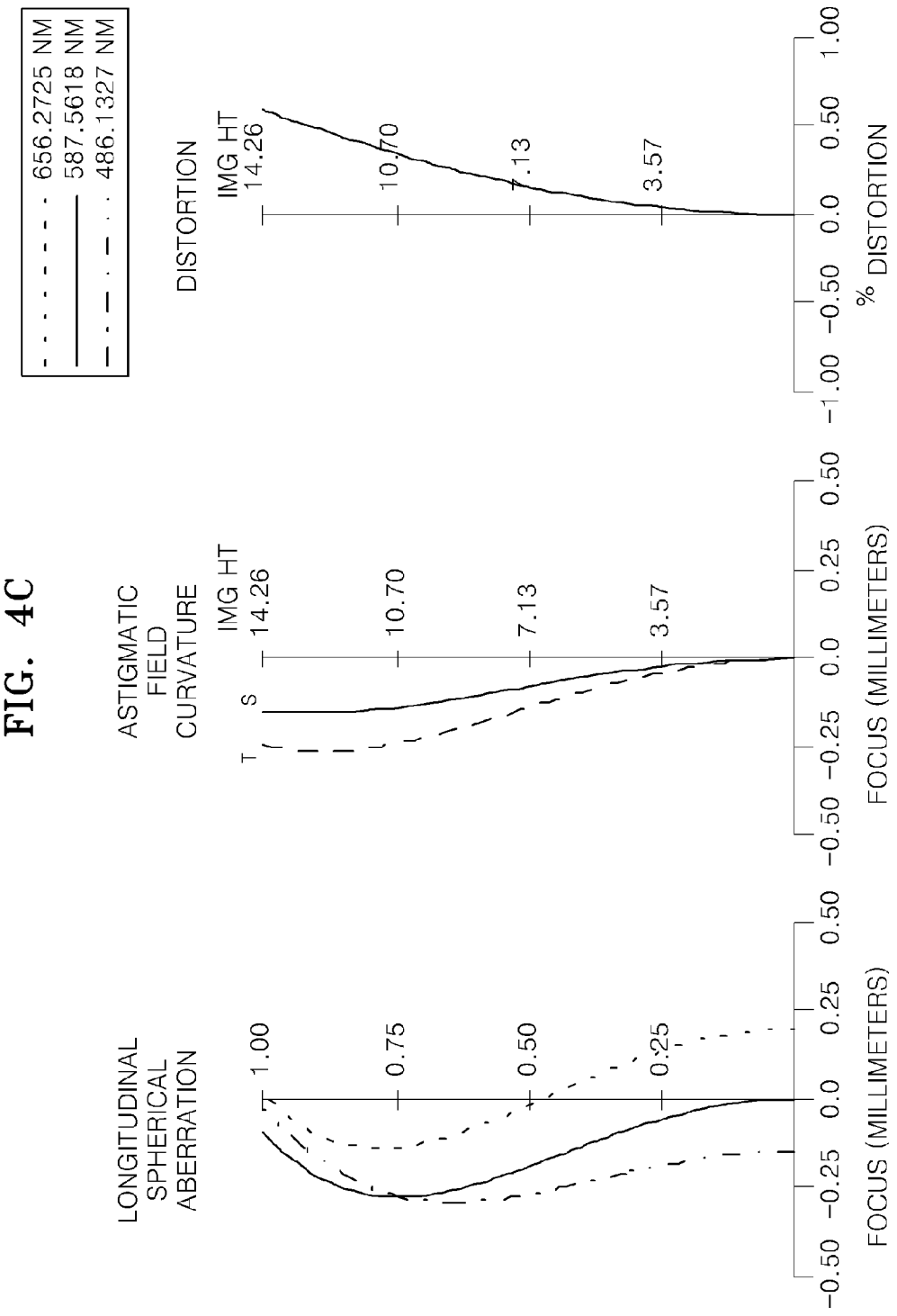
FIG. 4C is a graph showing longitudinal spherical aberration, astigmatic field curvature, and distortion of the macro lens system of FIG. 3, when M=−1.0.

FIG. 4A is a graph showing longitudinal spherical aberration, astigmatic field curvature, and distortion of the macro lens system of FIG. 3, when M=0.0. FIG. 4B is a graph showing longitudinal spherical aberration, astigmatic field curvature, and distortion of the macro lens system of FIG. 3, when M=−0.5. FIG. 4C is a graph showing longitudinal spherical aberration, astigmatic field curvature, and distortion of the macro lens system of FIG. 3, when M=−1.0. Spherical aberration occurs in relation to C-line, d-line, and F-line. C-line has a wavelength of 656.3 nm, d-line has a wavelength of 587.6 nm, and F-line has a wavelength of 486.1 nm. In the astigmatic field curvature, a solid line is aberration with respect to a sagittal image plane, and a dotted line is aberration with respect to a tangential image plane.

Third Embodiment

Figure 5:
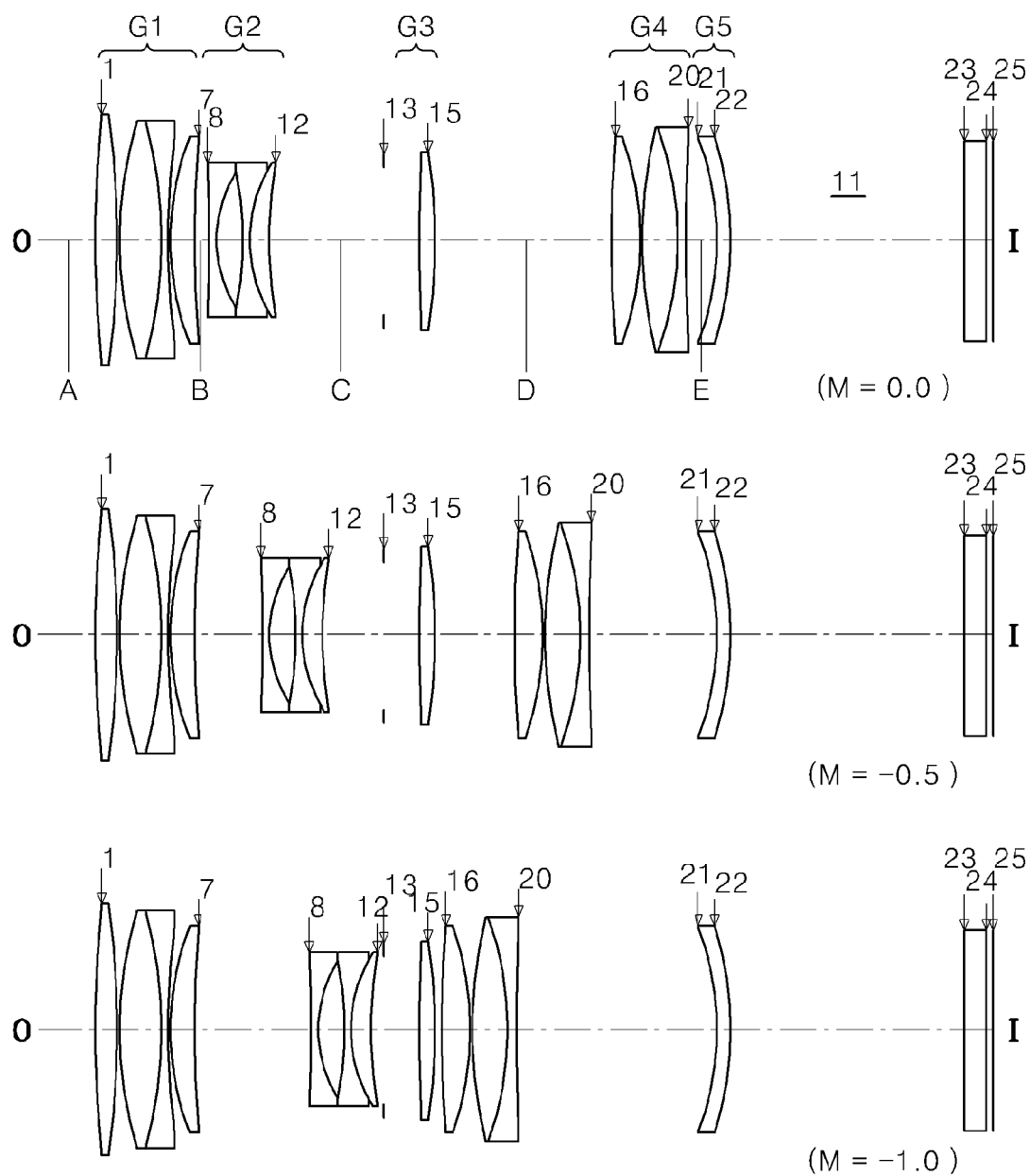
FIG. 5 is a view illustrating a macro lens system according to another embodiment, wherein magnification M satisfies each of the following Equations: M=0, M=−0.5, and M=−1.0.

FIG. 5 is a view illustrating a macro lens system according to another embodiment, wherein magnification M satisfies each of the following Equations: M=0, M=−0.5, and M=−1.0.

f = 59.6 mm, F-number = 2.44, 2ω = 27.4°

| Lens surface | Radius of curvature | Thickness or distance | Refractive index ($n_d$) | Abbe number ($v_d$) |
|---|---|---|---|---|
| OBJECT | ∞ | A | | |
| S1 | 174.391 | 3.34 | 1.88300 | 40.8 |
| S2 | −129.442 | 0.1 | | |
| S3 | 54.646 | 6.17 | 1.69680 | 55.5 |
| S4 | −73.371 | 1.1 | 1.84666 | 23.8 |
| S5 | 122.422 | 0.1 | | |
| S6 | 38.646 | 3.54 | 1.49700 | 81.6 |
| S7 | 192.193 | B | | |
| S8 | −125.636 | 1 | 1.60342 | 38.0 |
| S9 | 19.859 | 3.757 | | |
| S10 | −48.583 | 1 | 1.51680 | 64.2 |
| S11 | 22.466 | 2.85 | 1.84666 | 23.8 |
| S12 | 69.102 | C | | |
| S13 (STOP) | ∞ | 5.147 | | |
| S14 | 800 | 2.16 | 1.88300 | 40.8 |
| S15 | −89.12 | D | | |
| S16 | 212.973 | 4.21 | 1.49700 | 81.6 |
| S17 | −45.909 | 0.1 | | |
| S18 | 69.711 | 5.33 | 1.69680 | 55.5 |
| S19 | −47.446 | 1.05 | 1.80518 | 25.5 |
| S20 | 284.396 | E | | |
| S21 | −44.829 | 2 | 1.51680 | 64.2 |
| S22 | −53.561 | F | | |
| S23 | ∞ | 3.0 | 1.51680 | 64.2 |
| S24 | ∞ | G | | |
| S25 (IMAGE) | ∞ | | | |

The following chart shows variable distances in the macro lens system of FIG. 5 during focusing.

| Variable distance | M = 0.0 | M = −0.5 | M = −1.0 |
|---|---|---|---|
| A | ∞ | 142.2421 | 99.2525 |
| B | 2.4300 | 9.9533 | 17.2530 |
| C | 16.6530 | 9.1297 | 1.8300 |
| D | 25.5041 | 11.5828 | 1.2509 |
| E | 4.4452 | 18.3665 | 28.6984 |
| F | 34.0137 | 34.0137 | 34.0137 |

Figure 6A:
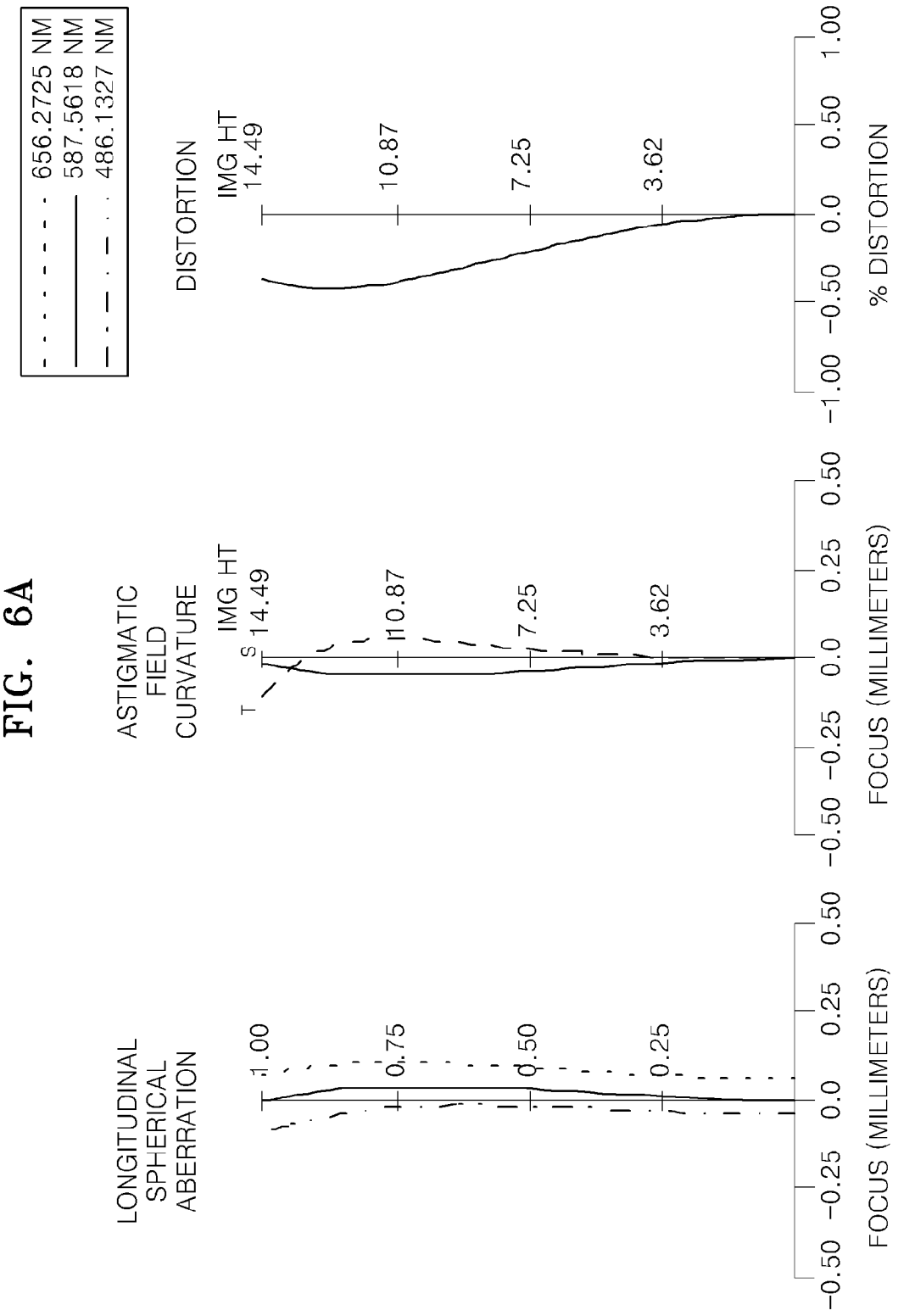
FIG. 6A is a graph showing longitudinal spherical aberration, astigmatic field curvature, and distortion of the macro lens system of FIG. 5, when M=0.0.
Figure 6C:
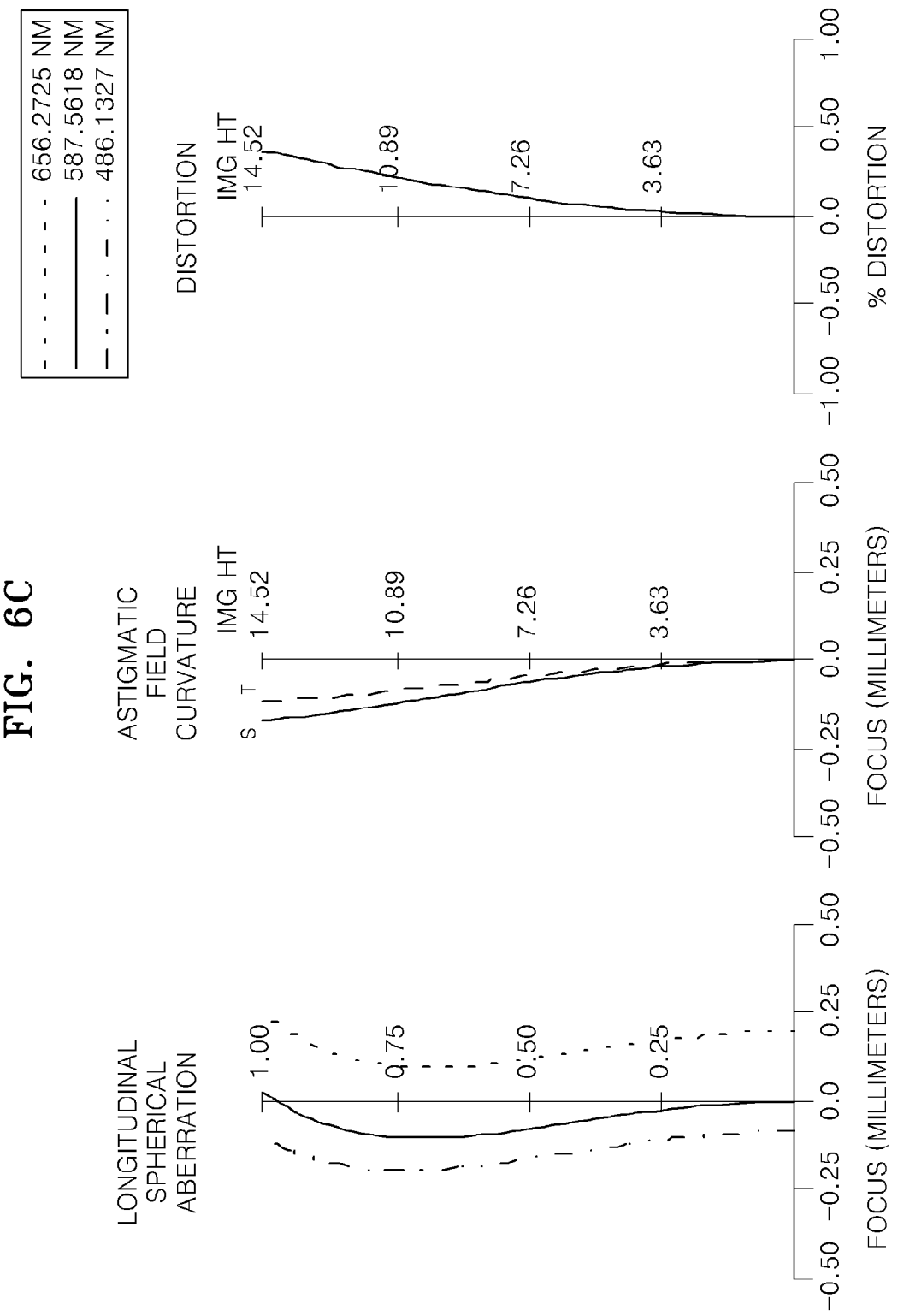
FIG. 6C is a graph showing longitudinal spherical aberration, astigmatic field curvature, and distortion of the macro lens system of FIG. 5, when M=−1.0.

FIG. 6A is a graph showing longitudinal spherical aberration, astigmatic field curvature, and distortion of the macro lens system of FIG. 5, when M=0.0. FIG. 6B is a graph showing longitudinal spherical aberration, astigmatic field curvature, and distortion of the macro lens system of FIG. 5, when M=−0.5. FIG. 6C is a graph showing longitudinal spherical aberration, astigmatic field curvature, and distortion of the macro lens system of FIG. 5, when M=−1.0. Spherical aberration occurs in relation to C-line, d-line, and F-line. C-line has a wavelength of 656.3 nm, d-line has a wavelength of 587.6 nm, and F-line has a wavelength of 486.1 nm. In the astigmatic field curvature, a solid line is aberration with respect to a sagittal image plane, and a dotted line is aberration with respect to a tangential image plane.

Next, each embodiment satisfies Expressions 1 and 2.

|  | First embodiment | Second embodiment | Third embodiment |
|---|---|---|---|
| Expression 1 | 0.85 | 0.0 | −0.80 |
| Expression 2 | −0.76 | −0.60 | −0.86 |

As described above, the macro lens system according to various embodiments has a large aperture and a small size, is lightweight, and is capable of close-up photographing up to 1× magnification. In addition, the overall length of the macro lens system does not change during focusing, thereby enabling miniaturization of the lens system so that the macro lens system is portable.

Figure 7:
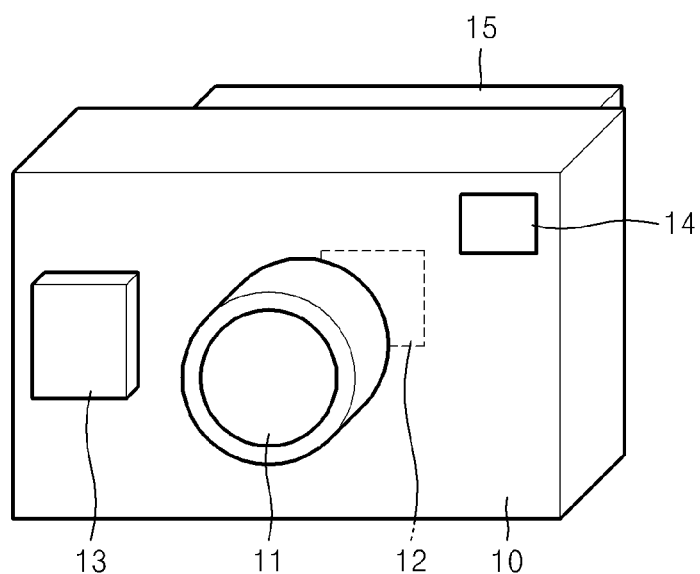
FIG. 7 is a view of a pickup device including a macro lens system according to an embodiment.

FIG. 7 is a view of a pickup device 10 including a macro lens system 11 according to an embodiment. Referring to FIG. 7, the pickup device 10 includes the macro lens system 11 as described in the above embodiments, and an imaging device 12 that receives light converged by the macro lens system 11. The pickup device 10 may include a recording unit 13 in which information corresponding to an object image that is photoelectrically converted by the imaging device 12 is recorded, and a view finder 14 for observing the object image. In addition, the pickup device may include a display unit 15 for displaying the object image. In FIG. 7, the pickup device 10 includes the view finder 14 and the display unit 15 separately, but may include only the display unit 15 without the view finder 14. The features of the pickup device are not limited to the features of the pickup device 10 of FIG. 7, and the pickup device may be used in various optical devices, in addition to cameras. As described above, the pickup device such as a digital camera includes the macro lens system 11, and thus an optical device with a small size that is inexpensive, bright, and capable of photographing up to 1× magnification may be obtained.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While a macro lens system according to the invention and a pickup device including the macro lens system have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A macro lens system which does not change in optical length as selected lens groups in the system are moved to bring an object on the object side of the lens system into focus on the image side of the lens system comprising, in order from an object side to an image side of the lens system:
    a first lens group having a positive refractive power that is fixed while the image is brought into focus;
    a second lens group having a negative refractive power that moves while the image is brought into focus;
    a third lens group having a positive refractive power that is fixed while the image is brought into focus;
    a fourth lens group having a positive refractive power that moves while the image is brought into focus;
    and a fifth lens group comprising only a single lens having a negative refractive power that is fixed while the image is brought into focus,
    wherein, during focusing to correct a change of an image plane caused by a variation in an object distance, the first lens group, the third lens group, and the fifth lens group are fixed, and the second lens group and the fourth lens group are moved, and
    wherein the macro lens system satisfies the expression:

$$-1.0 \leq \frac{c_f + c_r}{c_f - c_r} \leq 1.0$$

where $c_f$ denotes a curvature of a lens surface of the third lens group nearest to the object side, and $c_r$ denotes a curvature of a lens surface of the third lens group nearest to the image side.

2. The macro lens system of claim 1, wherein the first lens group comprises at least one doublet lens.

3. The macro lens system of claim 1, wherein the third lens group comprises a stop.

4. The macro lens system of claim 1, wherein the second lens group comprises no biconvex lens.

5. The macro lens system of claim 1, wherein a lens surface of the third lens group nearest to the image side is a convex lens surface or a planar lens surface.

6. The macro lens system of claim 1, having a magnification in a range of 0 to −1.

7. A macro lens system which does not change in optical length as lens groups in the system are moved to bring an object on the object side of the lens into focus on the image side of the lens system to correct a change of an image plane caused by a variation in an object distance comprising, in order from an object side to an image side:
a first lens group having a positive refractive power that is fixed while the image is brought into focus on the image side of the lens;
a second lens group having a negative refractive power that moves toward the image side from the object side while the image is brought into focus on the image side of the lens;
a third lens group having a positive refractive power that is fixed while the image is brought into focus on the image side of the lens;
a fourth lens group having a positive refractive power that moves toward the object side from the image side while the image is brought into focus on the image side of the lens; and
a fifth lens group having a negative refractive power that is fixed while the image is brought into focus on the image side of the lens, and
wherein the macro lens system satisfies the expression:

$$-0.9 \le \frac{f_1 \cdot f_2}{f_\infty \cdot (f_1 + f_2)} \le -0.55$$

where $f_1$ denotes a focal length of the first lens group, $f_2$ denotes a focal length of the second lens group, and $f_\infty$ denotes an overall focal length at an infinite object distance, and
the macro lens system also satisfies the expression:

$$-1.0 \le \frac{c_f + c_r}{c_f - c_r} \le 1.0$$

where $c_f$ denotes a curvature of a lens surface of the third lens group nearest to the object side, and $c_r$ denotes a curvature of a lens surface of the third lens group nearest to the image side.

8. The macro lens system of claim 7, wherein the third lens group comprises only one lens.

9. The macro lens system of claim 7, wherein the second lens group comprises no biconvex lens.

10. The macro lens system of claim 7, wherein a lens surface of the third lens group nearest to the image side is a convex lens surface or a planar lens surface.

11. The macro lens system of claim 7, having a magnification in a range of 0 to −1.

12. A pickup device comprising:
a macro lens system which does not change in optical length as lens groups in the system are moved to bring an object on the object side of the lens into focus on the image side of the lens system including in order from an object side to an image side:
a first lens group having a positive refractive power,
a second lens group having a negative refractive power,
a third lens group having a positive refractive power,
a fourth lens group having a positive refractive power, and
a fifth lens group comprising only a single lens having a negative refractive power; and
an imaging device that receives light converged by the macro lens system,
wherein, during focusing to correct a change of an image plane caused by a variation in an object distance, the first lens group, the third lens group, and the fifth lens group are fixed, and the second lens group and the fourth lens group are moved, and
wherein pickup device satisfies the expression:

$$-1.0 \le \frac{c_f + c_r}{c_f - c_r} \le 1.0$$

where $c_f$ denotes a curvature of a lens surface of the third lens group nearest to the object side, and $c_r$ denotes a curvature of a lens surface of the third lens group nearest to the image side.

13. The pickup device of claim 12, having a magnification in a range of 0 to −1.

14. A pickup device comprising:
a macro lens system which does not change in optical length as lens groups in the system are moved to bring an object on the object side of the lens into focus on the image side of the lens to correct a change of an image plane caused by a variation in an object distance including in order from an object side to an image side:
a first lens group having a positive refractive power that is fixed while the image is brought into focus,
a second lens group having a negative refractive power that moves toward the image side from the object side during focusing,
a third lens group having a positive refractive power that is fixed while the image is brought into focus,
a fourth lens group having a positive refractive power that moves toward the object side from the image side during focusing, and
a fifth lens group having a negative refractive power that is fixed while the image is brought into focus; and
an imaging device that receives light converged by the macro lens system, wherein the macro lens system satisfies the expression:

$$-0.9 \le \frac{f_1 \cdot f_2}{f_\infty \cdot (f_1 + f_2)} \le -0.55$$

where $f_1$ denotes a focal length of the first lens group, $f_2$ denotes a focal length of the second lens group, and $f_\infty$ denotes an overall focal length at an infinite object distance, and
the macro lens system also satisfies the expression:

$$-1.0 \le \frac{c_f + c_r}{c_f - c_r} \le 1.0$$

where $c_f$ denotes a curvature of a lens surface of the third lens group nearest to the object side, and $c_r$ denotes a curvature of a lens surface of the third lens group nearest to the image side.

* * * * *